United States Patent
Inoue

(10) Patent No.: US 8,410,019 B2
(45) Date of Patent: Apr. 2, 2013

(54) MODIFYING AGENT FOR COATING COMPOSITION FOR PRODUCING PROTECTIVE LAYER IN THERMOSENSITIVE RECORDING MEDIUM, COATING COMPOSITION FOR PROTECTIVE LAYER IN THERMOSENSITIVE RECORDING MEDIUM, AND THERMOSENSITIVE RECORDING MEDIUM USING THE SAME

(75) Inventor: Masato Inoue, Osaka (JP)

(73) Assignee: DIC Corporation, Tokyo (JP)

( * ) Notice: Subject to any disclaimer, the term of this patent is extended or adjusted under 35 U.S.C. 154(b) by 1331 days.

(21) Appl. No.: 12/096,889

(22) PCT Filed: Feb. 8, 2007

(86) PCT No.: PCT/JP2007/052243
§ 371 (c)(1),
(2), (4) Date: Jun. 10, 2008

(87) PCT Pub. No.: WO2007/091641
PCT Pub. Date: Aug. 16, 2007

(65) Prior Publication Data
US 2009/0048105 A1    Feb. 19, 2009

(30) Foreign Application Priority Data
Feb. 8, 2006    (JP) ................. 2006-030824

(51) Int. Cl.
*B41M 5/42* (2006.01)
(52) U.S. Cl. ........................... 503/226; 521/159
(58) Field of Classification Search .......... None
See application file for complete search history.

(56) References Cited

FOREIGN PATENT DOCUMENTS

| | | | |
|---|---|---|---|
| JP | 61270188 | A | 11/1986 |
| JP | 4-074686 | A | 3/1992 |
| JP | 4-082777 | A | 3/1992 |
| JP | 11-078243 | A | 3/1999 |
| JP | 2000-136226 | A | 5/2000 |
| JP | 2000-289333 | A | 10/2000 |
| JP | 2001-26181 | A | 1/2001 |
| JP | 2001-115076 | A | 4/2001 |
| JP | 2006-30932 | A | 2/2006 |
| WO | WO-2007023145 | A2 | 3/2007 |

OTHER PUBLICATIONS

Supplementary European Search Report issued Aug. 31, 2010, for European Application No. 07713951.7.

*Primary Examiner* — Bruce H Hess
(74) *Attorney, Agent, or Firm* — Edwards Wildman Palmer LLP; James E. Armstrong, IV; Nicholas J. DiCeglie, Jr.

(57) ABSTRACT

A modifying agent for a coating composition for producing a protective layer in a thermosensitive recording medium, wherein the modifying agent contains a polyurethane resin (A) having the structure represented by the following general formula (I) and a hydrophilic group, and an aqueous medium.

[chemical formula 1]

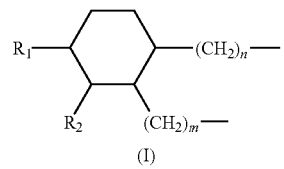

(I)

(in the general formula (I), $R_1$ and $R_2$ represent individually an alkyl group, and m and n represent individually an integer of 1 or greater.)

21 Claims, No Drawings

MODIFYING AGENT FOR COATING COMPOSITION FOR PRODUCING PROTECTIVE LAYER IN THERMOSENSITIVE RECORDING MEDIUM, COATING COMPOSITION FOR PROTECTIVE LAYER IN THERMOSENSITIVE RECORDING MEDIUM, AND THERMOSENSITIVE RECORDING MEDIUM USING THE SAME

CROSS-REFERENCE TO PRIOR APPLICATION

This is a U.S. National Phase Application under 35 U.S.C. §371 of International Patent Application No. PCT/JP2007/052243 filed Feb. 8, 2007, which claims the benefit of Japanese Application No. 2006-030824 filed Feb. 8, 2006, both of them are incorporated by reference herein. The International Application was published in Japanese on Aug. 16, 2007 as WO 2007/091641 A1 under PCT Article 21(2).

TECHNICAL FIELD

The present invention relates to a modifying agent for a coating composition usable for producing a protective layer in a thermosensitive recording medium, a coating composition containing the modifying agent for producing a protective layer, and a thermosensitive recording medium having a protective layer formed using the same.

BACKGROUND ART

In general, a thermosensitive recording medium has a thermosensitive layer containing a color former such as leuco dye, a developer such as a phenol compound, and a binder resin such as polyvinyl alcohol on a substrate such as paper, a plastic film, etc. In the thermosensitive recording medium, the color former reacts with a heated and melted developer, and develops colors, thereby desired characters, images, etc. are formed.

The thermosensitive recording medium can be printed using a thermosensitive printer which is commonly compact and makes minimum noise during printing. Therefore, recently, the thermosensitive recording medium is used for very various applications such as facsimile paper, receipts, train tickets, price tags for groceries and prepared food, bills for gas or water, etc.

However, conventional thermosensitive recording media had significant problems in practical use in that characters, etc. printed on the thermosensitive recording medium are faded or disappear in time due to external factors. Therefore, environmental conditions when storing should be carefully noted.

Specifically, when developed parts of characters, etc. printed in the thermosensitive recording medium come in contact with plastic goods, a plasticizer, etc. contained in the plastic goods transfers into the thermosensitive layer constituting the thermosensitive recording medium, and causes color fading of the characters, etc. Such problems are also caused when a food label which is a thermosensitive recording medium, contacts with a common food wrapping film for a certain period of time.

Due to this, it is difficult to maintain clear characters, etc. for a sufficiently long period of time in practical use without color fading of characters, etc. printed thermally in conventional thermosensitive recording media.

Solutions for these problems have been examined. For example, a method in which a protective layer is formed on the thermosensitive layer in the thermosensitive recording medium is known. By using this method, transfer of plasticizers, etc. to the thermosensitive layer is prevented. As a result, it is possible to prevent color fading of characters, etc. thermally printed.

Therefore, among the thermosensitive recording media available commercially these days, most of the thermosensitive recording media used in applications which need to prevent color fading of characters, etc. have a protective layer containing polyvinyl alcohols, etc. as a main component.

Although it is expected that the applicable scope of the thermosensitive recording medium will become further expanded, development of a thermosensitive recording medium with high added value is also desired by the industrial arena.

For example, the thermosensitive recording medium used as an admission ticket of a concert is desired to have non-thermosensitive color developing parts, where clear hue pictures, patterns, etc. are printed, for the purpose of addition of high design and appeal of commercial goods to consumers. In general, most of the pictures, patterns, etc. are printed on the protective layer. An offset printing method, which has been known as a method by which pictures having high level sharpness can be printed, is desired to be used as the printing method.

Offset printing method is a method in which a hydrophobic ink is attached to a plate reflected with images to be printed, then the ink attached to the plate is transferred to a rubber roller generally called a "blanket", and the ink attached to the blanket is adhered to paper to obtain printed material. The plate has printed areas which attach an ink and non-printed areas which do not attach an ink. The non-printed area is generally made wet with dampening water in order to prevent attachment of a hydrophobic ink.

However, most of the protective layer in the known thermosensitive recording media contains water-soluble substances such as polyvinyl alcohol as a main component. Therefore, the dampening water, which may be adhered to the protective layer while the protective layer is offset printed, sometimes causes various problems.

For example, there is a case in which when the dampening water contacts with the ink, the dampening water causes emulsion of the ink. Since the emulsified ink does not readily spread or attach to the protective layer in the thermosensitive recording medium, there is a case in which printing defects such as partial printing omissions (known generally as the "mizumake phenomena") are caused.

In addition, when polychrome printed material is obtained by an offset printing method, each color is generally printed repeatedly on the protective layer by the processes.

However, the dampening water attached on the protective layer by printing a first color ink prevents a second or later color ink from spreading and attaching on the protective layer. As a result, printing defects are sometimes caused.

Furthermore, the dampening water attached on the protective layer sometimes also causes elution of components constituting the protective layer. When the eluted component is deposited on the blanket, this sometimes causes printing defects (this is generally called "piling").

A coating composition, which can produce a protective layer which does not readily cause printing defects, in other words, a protective layer having excellent offset printing suitability and color fading resistance of characters or the like printed thermally, has been examined.

For example, it is known that a protective layer, which contains at least one compound selected from the group consisting of high fatty acid amides, substituted modified products thereof, and aromatic bisamides, and polyvinyl alcohol and have a specific bekk smoothness, has superior offset printing suitability (For example, Patent Document No. 1).

In addition, a method for obtaining excellent offset printing suitability by producing a protective layer having wet-ability to flaxseed oil which has comparable surface tension to that of printing inks has been known. As a resin composition capable to produce a protective layer, a resin composition containing a water-soluble polymer such as polyvinyl alcohol, a cross-linking agent such as dimethyolurea, etc. is exemplified (For example, Patent Document No. 2).

Furthermore, as a thermosensitive recording medium having an overcoat layer (protective layer) which has excellent water resistance and stampability to oil based inks, a thermosensitive recording medium having an overcoat layer containing a pigment, amorphous silica, a cross-linking agent, and 0.5 to 2.0 parts by weight of carboxy-modified polyvinyl alcohol with respect to 1 part by weight of the pigment has been known (For example, Patent Document No. 3).

Although the protective layer produced using the resin composition disclosed in Patent Documents Nos. 1 and 2 has excellent offset printing suitability on some level, the suitability is not still satisfactory. In addition, since it is difficult to prevent sufficiently the transfer of the plasticizer, etc., it is also difficult to decrease color fading or disappearing of characters, etc. printed on the thermosensitive recording medium to a sufficient level in practical use.

In addition, the overcoat layer produced using the composition disclosed in Patent Document No. 3 has superior stampability oil based inks, but this does not still have excellent offset printing suitability.

As explained above, in order to improve properties of the protective layer containing a water-soluble resin such as polyvinyl alcohol, several methods of containing both a cross-linking agent, a pigment, etc. have been studied. However, conventional techniques could not produce a protective layer in a thermosensitive recording medium, which has both excellent offset printing suitability and color fading resistance of characters, etc. Development of a modifying agent which can provide these excellent properties to the protective layer is still desired by the industrial arena.

Patent Document No. 1: Japanese Unexamined Patent Application, First Publication No. H04-074686
Patent Document No. 2: Japanese Unexamined Patent Application, First Publication No. H04-082777
Patent Document No. 3: Japanese Unexamined Patent Application, First Publication No. 2000-289333

DISCLOSURE OF THE INVENTION

Problems to be Solved

One of the problems to be solved by the present invention is to provide a modifying agent for a coating composition for producing a protective layer in a thermosensitive recording medium, which can provide both color fading resistance of characters, etc. printed thermally and excellent offset printing suitability to a protective layer.

In addition, the present invention has an object to provide a coating composition for producing a protective layer in a thermosensitive recording medium, which can provide both color fading resistance of characters, etc. printed thermally and excellent offset printing suitability to the protective layer, and a thermosensitive recording medium having a protective layer, which has both color fading resistance of characters, etc. printed thermally and excellent offset printing suitability.

Means for Solving the Problem

The inventors of the present invention thought that offset printing suitability of the protective layer in the thermosensitive recording medium could be improved by making the surface of the protective layer hydrophobic at a level which is hardly affected by the dampening water, and started to study this.

Specifically, a thermosensitive recording medium was produced by applying a coating composition for producing a protective layer, which contains fluorine resin generally known as a hydrophobic resin, in addition to water-soluble resin such as polyvinyl alcohol known as a component for producing a protective layer, on a thermosensitive layer, and drying at about 60° C. for about 90 seconds. Then, offset printing suitability of the produced thermosensitive recording medium was examined.

However, the surface of the protective layer in the produced thermosensitive recording medium was not made sufficiently hydrophobic. It was impossible to say that the thermosensitive recording medium had excellent offset printing suitability.

Then, the inventors of the present invention thought that the reason for insufficient hydrophobization of the surface of the protective layer is caused because fluorine atoms are not orientated on the surface of the protective layer. In order to orientate the fluorine atoms on the surface of the protective layer, the inventors thought that a method, in which the temperature in the drying process is adjusted to a relatively high temperature, was appropriate. Then, the drying conditions were changed to about 120° C. for 60 seconds, and a thermosensitive recording medium having a protective layer containing fluorine resin was produced again. The produced thermosensitive recording medium had a protective layer having a sufficiently hydrophobized surface, and excellent offset printing suitability. However, there was a problem that since the thermosensitive recording medium was subjected to the drying process in relatively high temperatures, the thermosensitive layer was developed.

In other words, it was possible to produce a protective layer which was sufficiently hydrophobized by applying a coating composition, which contains a resin which is known as a resin capable to apply hydrophobic properties such as a fluorine resin and a water-soluble resin such as polyvinyl alcohol, on a thermosensitive layer, and drying the surface coated at relatively high temperatures.

However, the production method of the thermosensitive recording medium can not include a process at relatively high temperatures, in order to prevent development of the thermosensitive layer. Therefore, it was difficult to produce substantially a protective layer which was sufficiently hydrophobized using a fluorine resin.

On the other hand, the inventor of the present invention thought that offset printing suitability could be improved partially by improving adhesive properties between a protective layer and an ink, and then started examination of this.

Examination of components capable to apply excellent adhesive properties between a protective layer and an ink was started using a urethane resin which was generally known as a resin having excellent adhesive properties to various substrates in the field of adhesives as a base component.

Specifically, a thermosensitive recording medium was produced by applying a coating composition containing a polyester urethane resin and the water-soluble resin on a thermosensitive layer, and then drying at about 60° C. for about 90 seconds. Then, offset printing suitability of the produced thermosensitive recording medium was examined.

However, the protective layer which was produced using the coating composition containing a polyester urethane resin could not improve offset printing suitability to a sufficient level.

So the inventor of the present invention thought that a protective layer having excellent offset printing suitability could be produced by using a urethane resin having a hydrophobic group. Then, a thermosensitive recording medium was produced by applying a coating composition for a protective layer containing a urethane resin having a long chain alkyl group which was generally known as a hydrophobic group as a side chain and the water-soluble resin, and then drying at about 60° C. for about 90 seconds. Then, offset printing suitability of the produced thermosensitive recording medium was examined.

Offset printing suitability of the protective layer produced using the coating composition containing the urethane resin was superior to that of the protective layer produced using the coating composition containing a polyester urethane resin. However, offset printing suitability was still not sufficient.

After the inventors of the present invention examined in order to produce a desired protective layer, they found that a modifying agent containing an aqueous medium and a urethane resin which has a specific structure represented by the following general formula (I), that is, a urethane resin in which carbon atoms adjacent to form a ring shape individually have an alkyl group, and a hydrophilic group can achieve excellent offset printing suitability and color fading resistance of characters, etc. printed thermally to a protective layer containing the water-soluble resin as a main component.

In addition, they found that the coating composition containing the urethane resin having the structure represented by the following general formula (I) and a hydrophilic group, water-soluble resin, and an aqueous medium can produce a protective layer having excellent offset printing suitability without causing development of the thermosensitive layer in the thermosensitive recording medium, and that the protective layer was superior in color fading resistance of characters, etc. printed thermally.

In other words, the present invention relates to a modifying agent for a coating composition for producing a protective layer in a thermosensitive recording medium, wherein the modifying agent contains a polyurethane resin (A) having the structure represented by the following formula (I) and a hydrophilic group, and an aqueous medium.

[chemical formula I]

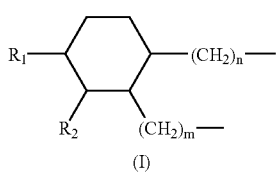

(I)

(in the general formula (I), $R_1$ and $R_2$ represent individually an alkyl group, and m and n represent individually an integer of 1 or greater.)

In addition, the present invention relates to a coating composition for producing a protective layer in a thermosensitive recording medium, wherein the coating composition contains a urethane resin (A) having the structure represented by the general formula (I) and a hydrophilic group, a water-soluble resin (C), and an aqueous medium.

Furthermore, the present invention relates to a thermosensitive recording medium having a protective layer produced by applying the coating composition for producing a protective layer on a thermosensitive layer, and evaporating the aqueous medium.

EFFECTS OF THE PRESENT INVENTION

According to the modifying agent for a coating composition for producing a protective layer in a thermosensitive recording medium, it is possible to apply excellent offset printing suitability and color fading resistance of characters, etc. printed thermally to a protective layer included in a thermosensitive recording medium.

Therefore, the thermosensitive recording medium having the protective layer produced using the coating composition for a protective layer containing the modifying agent can print pictures, patterns, etc. having a clear hue to the non-thermosensitive color developing parts by offset printing. Accordingly, the thermosensitive recording medium can be used for not only train tickets, labels for groceries, receipts, bills for gas or water, etc. but also in applications which require high design quality such as admission cards, and this is extremely useful.

BEST MODE FOR CARRYING OUT THE INVENTION

The modifying agent for a coating composition for producing a protective layer in a thermosensitive recording medium contains polyurethane (A), which has the structure represented by the following general formula (I) and a hydrophilic group, an aqueous medium, and other components if necessary.

[Chemical formula 2]

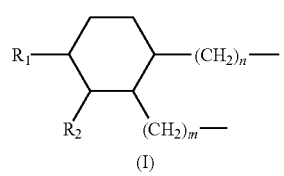

(I)

(in the general formula (I), $R_1$ and $R_2$ represent individually an alkyl group, and m and n represent individually an integer of 1 or greater)

The polyurethane resin (A) used in the modifying agent for a coating composition for producing a protective layer in a thermosensitive recording medium has a structure represented by the general formula (I).

The structure represented by the general formula (I) is an essential structure to apply excellent offset printing suitability to the surface of a protective layer in a thermosensitive recording medium. In the structure, as represented by the general formula (I), adjacent carbon atoms have independently a hydrophobic alkyl group. The hydrophobic alkyl group is easily orientated near the surface of a protective layer to be produced even when the coating composition for producing a protective layer, which contains the modifying agent of the present invention, is coated on a thermosensitive layer, and dried at relatively low temperatures to dry the coated surface. Therefore, according to the coating composition for producing a protective layer in the present invention, it is possible to form a protective layer, which has excellent offset printing suitability and is sufficiently hydrophobized, without development of the thermosensitive layer.

In the general formula (I), $R_1$ and $R_2$ represent individually an alkyl group. In general, the alkyl group may have carbon atoms in a range from 1 to 20. Among these, the alkyl group preferably has carbon atoms in a range from 5 to 10, because raw material used in introducing the structure represented by the general formula (I) in the polyurethane (A) can be easily obtained.

In addition, the alkyl group may be straight or branched.

In general formula (I), m and n represent individually an integer of 1 or greater, preferably an integer in a range from 1 to 20, and more preferably an integer in a range from 5 to 10.

The polyurethane resin (A) preferably contains the structure represented by the general formula (I) in a range from 5 to 50% by mass relative to the entire polyurethane resin (A), and more preferably in a range from 10 to 40% by mass. When the polyurethane resin having the structure represented by the general formula (I) in the range is used, it is possible to form a protective layer which has a sufficiently hydrophobized surface, and has excellent offset printing suitability.

Moreover, the mass ratio of the structure represented by the general formula (I) is a value calculated by dividing an amount of raw material used to introduce the structure represented by the general formula (I) in raw material used to produce the polyurethane resin (A) by the total mass of the polyurethane resin (A).

In addition, the polyurethane resin (A) used in the present invention has a hydrophilic group which is required to be dissolved or dispersed in an aqueous medium. Examples of the hydrophilic group include anionic groups, cationic groups, nonionic groups, and ampholytic groups, which are well-known and in common use. Among these, anionic groups are preferable because raw material for introducing the hydrophilic group is easily obtained, increase of viscosity, gelatinization, and agglomeration of the coating composition for producing a protective layer in a thermosensitive recording medium hardly occur, and excellent color fading resistance of characters, etc. printed thermally is maintained.

Examples of the anionic group include a carboxyl group, a carboxylate group, a sulfonic group, and a sulfonate group. Among these, a carboxyl group and a carboxylate group are preferable. In particular, a carboxylate group is more preferable because it improves dispersibility or solubility of the polyurethane resin (A) in an aqueous medium, and maintains excellent color fading resistance of characters, etc.

The hydrophilic group is preferably added in a range from 50 to 2,000 mmol/kg relative to the total amount of the polyurethane resin (A). The polyurethane resin (A) having the hydrophilic groups in the range has excellent dispersion stability in an aqueous medium.

Moreover, the content of the hydrophilic group is a value calculated by dividing the mass (g) of raw material contributing to the introduction of the hydrophilic group in the raw material used in producing the polyurethane resin (A) by the equivalent (g/equivalent) of the hydrophilic group of the raw material, and further dividing with the mass of by polyurethane resin (A).

In addition, when the hydrophilic group is a carboxyl group or a carboxylate group, the mass ratio [mass of the structure represented by the general formula (I)/number of a carboxyl group or a carboxylate group] is preferably in a range from 2.0 to 15.0, and more preferably in a range from 2.0 to 10.0.

When the polyurethane resin has the mass ratio of [mass of the structure represented by the general formula (I)/number of a carboxyl group or a carboxylate group] in the range, it is possible to apply excellent offset printing suitability and color fading resistance to the formed protective layer. In addition, it is also possible to improve moisture dispersion stability of the modifying agent and the coating composition containing the modifying agent of the present invention.

Moreover, the content of the carboxyl group and the carboxylate group is a mass ratio of the carboxyl group and the carboxylate group relative to the total mass of the polyurethane resin (A). The mass ratio is calculated based on the amount of raw material used to contribute to the introduction of the carboxyl group, etc. in the polyurethane resin (A), and the mass ratio (%) of the carboxyl group, etc. in the raw material.

The mass ratio of the polyurethane resin (A) relative to the total amount of the modifying agent in a coating composition for producing a protective layer in a thermosensitive recording medium is preferably in a range from 10 to 50% by mass, and more preferably in a range from 20 to 40% by mass.

For example, the polyurethane resin (A) can be produced by reacting a polyol (a1) having the structure represented by the general formula (I), an active hydrogen atom-containing compound (a2) having a hydrophilic group, and a polyisocyanate (a3).

Examples of the polyol (a1) having the structure represented by the general formula (I) include hydrogenated dimer diols (a1-1), polyester polyols (a1-2) produced by reacting the hydrogenated dimer diol (a1-1) with polycarboxylic acid, and polyester polyols (a1-3) produced by reacting a hydrogenated dimer acid with a polyol. Among these, the hydrogenated dimer diol (a1-1) is preferable because it further improves offset printing suitability and color fading resistance of characters, etc. printed thermally.

The hydrogenated dimer diol (a1-1) is a compound having a hydroxyl group obtained by contacting a dimer acid, which is mainly a dimer of an unsaturated aliphatic acid, with hydrogen under high pressure to reduce.

Examples of the unsaturated aliphatic acid include oleic acid, linoleic acid, and linolenic acid. They are preferably used, because they are easily obtained, and make offset printing suitability of the protective layer formed using a coating composition for producing a protective layer in a thermosensitive recording medium excellent.

The hydrogenated dimer diol (a1-1) can be produced from natural vegetable aliphatic acids. In general, a commercialized product thereof contains trimers of the unsaturated aliphatic acids, and by-product material, which is a hydroxyl group containing a compound obtained by reducing, etc., in addition to the hydrogenated dimer diol (a1-1).

In addition, the polyester polyol (a1-2) is an ester compound produced by reacting the hydrogenated dimer diol (a1-1) with a polycarboxylic acid in a conventional well-known manner.

As the hydrogenated dimer diol (a1-1) for producing the polyester polyol (a1-2), the hydrogenated dimer diols explained above can be used.

Example of the polycarboxylic acid include succinic acid, adipic acid, azelaic acid, sebacic acid, dodecane dicarboxylic acid, maleic acid, fumaric acid, 1,3-cyclopentane dicarboxylic acid, 1,4-cyclohexane dicarboxylic acid, terephthalic acid, isophthalic acid, phthalic acid, 1,4-naphthalene dicarboxylic acid, 2,6-naphthalene dicarboxylic acid, naphthalic acid, biphenyl dicarboxylic acid, 1,2-bis(phenoxy)ethane-p,p'-dicarboxylic acid, trimellitic acid, pyromellitic acid, anhydride and esters thereof.

In addition, as the polyester polyol (a1-3), a product obtained by reacting hydrogenated dimer acid with polyo can be used.

The hydrogenated dimer acid is a compound in which a hydrogen atom is added to an unsaturated double bond of the dimer acid which is a dimer of the unsaturated aliphatic acid. The hydrogenated dimer acid can be produced from natural vegetable oil aliphatic acids. In general, a commercialized product thereof contains trimers of the unsaturated aliphatic acid, and by-product materials such as a compound having a hydroxyl group obtained by reducing the trimers, etc., in addition to the hydrogenated dimer acid.

In addition, examples of polyol which can be used in producing the polyester polyol (a1-3) include ethylene glycol, propylene glycol, 1,3-propane diol, 1,3-butane diol, 1,4-butane diol, 1,5-pentane diol, 3-methyl-1,5-pentane diol, 1,6-hexane diol, neopentyl glycol, diethylene glycol, triethylene glycol, tetraethylene glycol, dipropyrene glycol, tripropylene glycol, 1,4-cyclohexane diol, 1,4-cyclohexane dimethanol, trimethylol propane, trimethylol ethane, pentaerythritol, sorbitol, bisphenol A, hydrogenated bisphenol A, and alkylene oxide adducts of bisphenol A and hydrogenated bisphenol A. Among these, polyols having a number average molecular weight in a range from 60 to 200 such as ethylene glycol, 1,4-butane diol, 1,6-hexane diol, neopentyl glycol, and 1,4-cyclohexane dimethanol are preferable.

In addition to these polyols, examples of polyol which can be used to produce the polyester polyol (a1-3) include polyethylene glycols having a number average molecular weight in a range from 300 to 6,000, polypropylene glycols having a number average molecular weight in a range from 300 to 6,000, and ethylene oxide-propylene oxide copolymers having a number average molecular weight in a range from 300 to 6,000.

Examples of the active hydrogen atom-containing compound (a2) which can be used to produce the polyurethane resin (A) include sulfonic acid group-containing compounds such as 2-hydroxyethane sulfonic acid, phenol sulfonic acid, sulfobenzoic acid, sulfosuccinic acid, 5-sulfoisophtalic acid, sulfanilic acid, 1,3-phenylene diamine-4,6-disulfonic acid, and 2,4-diaminotoluene-5-sulfonic acid; carboxyl group-containing compounds such as 2,2-dimethylol propionic acid, 2,2-dimethyol butyric acid, 2,2-dimethyol valeric acid, dioxymaleic acid, 2,6-dioxybenzoic acid, and 3,4-diamino benzoic acid, derivatives and copolymers thereof.

Example of the polyisocyanate (a3) which can be used to produce the polyurethane resin (A) include 2,4-tolylene diisocyanate, 2,6-tolylene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, 3,3'-dimethyl-4,4'-biphenylene diisocyanate, 3,3'-dimethoxy-4,4'-biphenylene diisocyanate, 3,3'-dichloro-4,4'-biphenylene diisocyanate, 1,5-naphthalene diisocyanate, 1,5-tetrahydronaphthalene diisocyanate, tetramethylene diisocyanate, 1,6-hexamethylene diisocyanate, dodecamethylene diisocyanate, trimethylhexamethylene diisocyanate, 1,3-cyclohexylene diisocyanate, 1,4-cyclohexylene diisocyanate, xylene diisocyanate, tetramethylxylylene diisocyanate, hydrogenated xylylene diisocyanate, lysine diisocyanate, isophorone diisocyanate, 4,4'-dicyclohexylmethane diisocyanate, 3,3'-dimethyl-4,4'-dicyclohexylmethane diisocyanate, and trimer thereof.

As the polyisocyanate (a3), 2,4-tolylene diisocyanate, 2,6-tolylene diisocyanate, 4,4'-diphenylmethane diisocyanate, 2,4'-diphenylmethane diisocyanate, 2,2'-diphenylmethane diisocyanate, 1,6-hexamethylene diisocyanate, 1,3-cyclohexylene diisocyanate, isophorone diisocyanate, 4,4'-dicyclohexylmethane diisocyanate, and 3,3'-dimethyl-4,4'-dicyclohexylmethane diisocyanate are preferable, because they are relatively inexpensive and easily obtained.

In addition, polyisocyanate having three or greater of an isocyanate group is preferably used together with the polyisocyanate (a3). When the polyisocyanate is used at the same time, a three-dimensional cross-linking structure is formed in the polyurethane resin (A). As a result, a protective film having remarkably excellent offset printing suitability can be produced.

In addition, the aqueous medium contained in the modifying agent is water or an organic solvent compatible with water. Examples of the organic solvent compatible with water include alcohol such as methanol, ethanol, n-propanol, and isopropanol; ketones such as acetone and methylethylketone; polyalkylene glycols such as ethylene glycol, diethylene glycol, and propylene glycol; alkyl ethers such as polyalkylene glycol; and amides such as N-methyl-2-pyrrolidone. In the present invention, water, a mixture containing water and an organic solvent compatible with water, or only an organic solvent compatible with water may be used as the aqueous medium.

The mass ratio of the aqueous medium relative to the total mass of the modifying agent of the present invention is preferably in a range from 50 to 90% by mass, and more preferably in a range from 60 to 80% by mass.

As explained above, an organic solvent compatible with water may be used. However, the aqueous medium preferably contains as little the organic solvent as possible and the most preferably only water, because the thermosensitive layer constituting the thermosensitive recording medium is commonly developed easily by the influence of organic solvents. The same is true from the viewpoint of safety and load to environment.

When the polyurethane resin (A) is produced, other raw materials can be used at the same time if necessary, in addition to the polyol (a1) having the structure represented by the general formula (I), an active hydrogen atom-containing compound (a2) having a hydrophilic group, and a polyisocyanate (a3).

Examples of the other raw material include polyols other than the polyol (a1) having the structure represented by the general formula (I).

Examples of the polyols other than the polyol (a1) include polyester polyols other than polyester polyols (a1-2) and (a1-3), polyether polyols, polycarbonate polyols, polyester amide polyols, polyacetal polyols, polythioether polyols, and polybutadiene glycols.

Among these polyols, examples of polyester polyols, polyether polyols, and polycarbonate polyols, which are easily obtained industrially, are explained below.

Examples of the polyester polyol, which can be used as the polyol other than the polyol (a1), include compounds produced by esterfying polyol and polycarboxylic acid.

Examples of the polyol include the same polyols listed as polyols which can be used to produce the polyester polyol (a1-3).

Examples of the polycarboxylic acid include the same polycarboxylic acids listed as polycarboxylic acids which can be used to produce the polyester polyol (a1-2). However, among these, aromatic polycarboxylic acids are preferable, because they can improve color fading resistance of characters, etc. printed thermally.

Examples of the polyester polyol include compounds produced by ring-opening polymerizing cyclic ester compounds such as ε-caprolactone.

In addition, examples of polyether polyols used as the other polyols include compounds produced by addition polymerizing at least one of ethylene oxide, propylene oxide, butylene oxide, styrene oxide, epichlorohydrin, tetrahydrofuran, and cyclohexylene using a compound having at least two activated hydrogen atoms, which are explained below, as an initiator.

Example of the compound having at least two activated hydrogen atoms include ethylene glycol, diethylene glycol, triethylene glycol, propylene glycol, 1,3-propane diol, 1,3-butane diol, 1,4-butane diol, hexamethylene glycol, saccharose, methylene glycol, glycerin, sorbitol, acnitic acid, trimellitic acid, hemimeritic acid, phosphoric acid, ethylene diamine, propylene diamine, diethylene triamine, triisopropanol amine, pyrogallol, dihydrobenzoic acid, hydroxyphthalic acid, and 1,2,3-propane trithiol.

The polycarbonate polyol is obtained by carrying out the esterification reaction between carbonic acid, and aliphatic polyol or alicyclic polyol. Examples of the polycarbonate polyol include reaction products between diol such as 1,3-propanediol, 1,4-butanediol, 1,5-pentanediol, 1,6-hexanediol, diethylene glycol, polyethylene glycol, polypropylene glycol, polytetramethylene glycol, and 1,4-cyclohexane dimethanol, and dialkyl carbonate such as dimethyl carbonate or cyclic carbonate such as ethylene carbonate.

As the other polyol, polyols having an average molecular weight in a range from 200 to 10,000 are preferable, and polyols having an average molecular weight in a range from 300 to 5,000 are more preferable.

Examples of a method for producing the modifying agent for a coating composition for producing a protective layer in the thermosensitive recording medium of the present invention include the following methods.

[Method 1] A method in which polyol-containing polyol (a1) having the structure represented by the general formula (I), an active hydrogen atom-containing compound (a2) having a hydrophilic group, and polyisocyanate (a3) are put in a vessel at the same time or dividedly, they are reacted in a solvent or without a solvent to produce a polyurethane resin, then after a part or all of the hydrophilic groups in the urethane resin are neutralized with a neutralizer, an aqueous medium is added, and they are dispersed or dissolved.

[Method 2] A method in which polyol-containing polyol (a1) having the structure represented by the general formula (I), an active hydrogen atom-containing compound (a2) having a hydrophilic group, and polyisocyanate (a3) are put in a vessel at the same time or dividedly, they are reacted in a solvent or without a solvent to produce a urethane prepolymer having an isocyanate group at the end, then a polyurethane resin is produced by chain elongation reaction using an active hydrogen atom-containing compound such as polyamine, and after a part or all of the hydrophilic groups in the urethane resin are neutralized with a neutralizer, an aqueous medium is added, and they are dispersed or dissolved.

[Method 3] A method in which polyol-containing polyol (a1) having the structure represented by the general formula (I), an active hydrogen atom-containing compound (a2) having a hydrophilic group, and polyisocyanate (a3) are put in a vessel at the same time or dividedly, they are reacted in a solvent or without a solvent to produce a urethane prepolymer having an isocyanate group at the end, and after a part or all of the hydrophilic groups in the urethane prepolymer are neutralized with a neutralizer, an aqueous medium is added to disperse or dissolve the urethane prepolymer in the aqueous medium, and then this is subjected to a chain elongation reaction using an active hydrogen atom-containing compound.

[Method 4] A method in which polyol-containing polyol (a1) having the structure represented by the general formula (I), an active hydrogen atom-containing compound (a2) having a hydrophilic group, and polyisocyanate (a3) are put in a vessel at the same time or dividedly, they are reacted in a solvent or without a solvent to produce a urethane prepolymer having an isocyanate group at the end, and after a part or all of the hydrophilic groups in the urethane prepolymer are neutralized with a neutralizer, the urethane prepolymer is emulsified and dispersed forcibly in an aqueous medium using a machinery such as a homogenizer, and then this is subjected to a chain elongation reaction using an active hydrogen atom-containing compound.

[Method 5] A method in which polyol-containing polyol (a1) having the structure represented by the general formula (I), an active hydrogen atom-containing compound (a2) having a hydrophilic group, and polyisocyanate (a3) are put in a vessel at the same time or dividedly, they are reacted in a solvent or without a solvent to produce a urethane resin, then after a part or all of the hydrophilic groups in the urethane resin are neutralized with a neutralizer, an aqueous medium is added, and this is dispersed or dissolved.

Among these methods, Methods 3 and 4 are preferable, because formation of a three dimensional cross-linking structure in the polyurethane resin (A) is the easiest.

Examples of the active hydrogen atom-containing compound which is used to produce the polyurethane resin (A) include polyamine.

Examples of the polyamine include diamines such as ethylenediamine, 1,2-propanediamine, 1,6-hexamethylenediamine, piperazine, 2,5-dimethylpiperazine, isophoronediamine, 4,4'-dicyclohexyl methanediamine, 3,3'-dimethyl-4,4'-dicyclohexyl methanediamine, and 1,4-cyclohexanediamine; diamines having one primary amine and one secondary amine such as N-hydroxy methylamino ethylamine, N-hydroxy ethylamino ethylamine, N-hydroxy propylamino propylamine, N-ethylamino ethylamine and N-methylamino propylamine; polyamines such as diethylenetriamine, dipropylenetriamine and triethylenetetramine; hydrazines such as hydrazine, N,N'-dimethylhydrazine, and 1,6-hexamethylene bishydrazine; dihydrazides such as dihydrazide succinate, dihydrazide adipate, dihydrazide glutarate, dihydrazide sebaciate, dihydrazide isophthalate; and semicarbazides such as β-hydrazide semicarbazide propionate, 3-semicarbazide-propyl-carbazic acid ester, and semicarbazide-3-semicarbazidemethyl-3,5,5-trimethylcyclohexane.

Among these polyamines, polyamines having an amino group of three equivalents or more in a molecule are preferable, because they can provide a protective layer which can improve markedly offset printing suitability of the thermosensitive recording medium. In addition, diethylenetriamine and triethylenetetramine are also preferable, because they can be easily obtained, and can form a better cross-linking structure.

Furthermore, examples of an active hydrogen atom-containing a compound other than the polyamine include polyols having a low molecular weight such as ethylene glycol, diethylene glycol, triethylene glycol, propylene glycol, 1,3-propanediol, 1,3-butanediol, 1,4-butanediol, hexamethylene glycol, saccharose, methylene glycol, glycerin, and sorbitol; phenols such as bisphenol A, 4,4'-dihydroxydiphenyl, 4,4'-dihydroxydiphenyl ether, 4,4'-dihydroxy diphenylsulfone, hydrogenated bisphenol A, and hydroquinone; and water. Among these, active hydrogen atom-containing compounds having three equivalents or more are preferable, because they can provide a protective layer which can improve markedly offset printing suitability of the thermosensitive recording medium.

The aqueous medium which is used to produce the modifying agent is water, and an organic solvent which is compatible with water, as explained above.

A production process for the modifying agent can be performed under non-solvent conditions. As explained above, in general, the thermosensitive layer constituting the thermosensitive recording medium is easily developed by influences of organic solvents. In addition, when safety and load on the environment are taken into consideration, the amount of organic solvent used is preferably low, and it is more preferable to use only water. However, when the reaction is conducted under the presence of an organic solvent, the reaction is easily controlled. In addition, there is also an advantage in that the viscosity of the reaction product becomes low, and stirring load in a reaction process can be reduced.

Examples of the organic solvent preferably used for obtaining the advantage include ketones such as acetone, diethyl ketone, methyl ethyl ketone, and methyl isobutyl ketone; ethers such as diethylether, ethylene glycol dimethyl ether, ethylene glycol diethylether, ethylene glycol dibutyl ether, tetrahydrofuran, and dioxane; acetate esters such as ethyl acetate, butyl acetate, and propyl acetate; nitriles such as acetonitrile; hydrocarbons such as n-pentane, n-hexane, cyclohexane, n-heptane, benzene, toluene, and xylene; chlorinated hydrocarbons such as carbon tetrachloride, dichloromethane, chloroform, and trichloroethane, and amides such as dimethylformamide, and N-methyl pyrrolidone.

As for an organic solvent contained in a modifying agent for a coating composition for producing a protective layer in a thermosensitive recording medium obtained under the existence of an organic solvent as mentioned above, it is preferred to remove, for example by methods such as distillation under reduced pressure, after ending or in middle of the reaction, if necessary.

In addition, a well-known catalyst can be used if necessary when producing a modifying agent for a coating composition for producing a protective layer.

Examples of the catalyst include tin compounds such as stannous octylate, dibutyltin dilaurate, dibutyltin dimaleate, dibutyltin diphthalate, dibutyltin dimethoxide, dibutyltin diacetylacetate and dibutyltin dibarsatate, titanate compounds such as tetrabuthyl titanate, tetraisopropyl titanate, and triethanolamine titanate, tertiary amine, and quarternary ammonium salt.

Various kinds of neutralizer can be used to neutralize a part or all of the hydrophilic groups in the urethane resin (A), depending on the hydrophilic group. Specifically, when the hydrophilic group is an anionic group, for example, nonvolatile bases such as sodium hydroxide, and potassium hydrate; and volatile bases such as tertiary amines such as trimethylamine, triethylamine, dimethylethanolamine, methyldiethanolamine, and triethanolamine, and ammonia can be used.

Among these, ammonia is preferably used, because this does not readily develop non-developed parts of the thermosensitive recording medium of the present invention, and is not readily affected by adverse effects of a thermal head of a thermal printer.

In addition, when distributing the polyurethane resin (A) in an aqueous medium, an emulsifier may be used, if necessary.

However, an emulsifier may slightly reduce the offset printing suitability of a protective layer formed, and color fading resistance of characters, etc. printed thermally. Therefore, as for an emulsifier, it is preferred to use it in the range which does not prevent the effects of the present invention, and the amount of the emulsifier used is more preferable as little as possible.

The modifying agent for a coating composition for producing a protective layer in a thermosensitive recording medium of the present invention preferably contains polyurethane resin (B) which has a structure derived from polyester polyol obtained by reacting an aromatic polycarboxylic acid and polyol and a hydrophilic group, other than the polyurethane resin (A). The modifying agent for a coating composition for producing a protective layer in a thermosensitive recording medium containing the polyurethane resin (A) and the polyurethane resin (B) can achieve extremely excellent color fading resistance of characters, etc. to the protective layer in the thermosensitive recording medium.

The polyurethane resin (B) can be produced using relatively cheap raw material. In contrast, in order to introduce the structure represented by the general formula (I) in the polyurethane resin (A), it is necessary to use relatively expensive raw material such as polyol (a1). Therefore, it is possible to reduce the cost for producing a modifying agent for a coating composition for producing a protective layer in a thermosensitive recording medium of the present invention by using cheap polyurethane resin (B) together with the polyurethane resin (A).

The polyurethane resin (B) can be produced by reacting polyester polyol which is obtained by reacting an aromatic polycarboxylic acid and polyol, polyisocyanate, and an active hydrogen atom-containing compound having a hydrophilic group.

Examples of the aromatic polycarboxylic acid used to produce the polyurethane resin (B) include terephthalic acid, isophthalic acid, phthalic acid, 1,4-naphthalene dicarboxylic acid, 2,6-naphthalene dicarboxylic acid, naphthalic acid, biphenyl dicarboxylic acid, 1,2-bis(phenoxy)ethane-p,p'-dicarboxylic acid, trimellitic acid, pyromellitic acid, anhydrides thereof and esterificated compounds thereof.

As polyol usable to produce the polyurethane resin (B), the same polyols as those usable to produce the polyurethane resin (A) can be used.

As polyisocyanate usable to produce polyurethane resin, the same polyisocyanates as those usable to produce the polyurethane resin (A) can be used.

As an active-hydrogen atom-containing compound to produce the polyurethane resin (B), the same active-hydrogen atom-containing compounds as those usable to produce the polyurethane resin (A) can be used.

When using the polyurethane resin (B) in a modifying agent of the present invention, a mass ratio [polyurethane resin (A):polyurethane resin (B)] of the polyurethane resin (A) and polyurethane resin (B) is preferably in a range of 10-90:10-90, and more preferably in a range of 10-50:50-90. The modifying agent for a coating composition for producing a protective layer in a thermosensitive recording medium containing polyurethane resin (B) in this range can achieve excellent offset printing suitability and color fading resistance to characters, etc. printed thermally to a protective layer.

Next, a coating composition for producing a protective layer in a thermosensitive recording medium of the present invention is explained.

A coating composition for producing a protective layer in a thermosensitive recording medium of the present invention contains the urethane resin (A) having the structure represented by the general formula (I) and a hydrophilic group, the water-soluble resin (C), an aqueous medium, and other additives, if necessary.

A coating composition for producing a protective layer in a thermosensitive recording medium of the present invention can be produced by mixing and stirring the modifying agent for a coating composition for producing a protective layer in a thermosensitive recording medium containing the polyurethane resin (A), the water-soluble resin (C), and inorganic particles (D) if necessary.

In addition, the coating composition for producing a protective layer can also be produced by making previously a master batch containing the inorganic particles (D), the water-soluble resin (C), and various additives, and mixing the master batch and the modifying agent for a coating composition for producing a protective layer.

The coating composition for producing a protective layer contains preferably a nonvolatile component in a range from 5 to 60% by mass, because it is possible to maintain excellent coating workability and moisture powder stability.

The content of the polyurethane resin (A) in the coating composition for producing a protective layer is preferably in a range from 0.1 to 10% by mass relative to the 100% by mass of the coating composition for producing a protective layer.

The water-soluble resin (C) contained in the coating composition for producing a protective layer contributes to improving the offset printing suitability of the protective layer, and color fading resistance of characters, etc. printed thermally. When the coating composition contains the inorganic particles (D), the water-soluble resin (C) functions as a binder of the inorganic particles (D).

Examples of the water-soluble resin (C) include cellulose derivatives such as polyvinyl alcohol, polyvinyl pyrrolidone, polyvinyl acetal, polyalkylene oxide, starch, methyl cellulose, hydroxyl cellulose, hydroxypropyl cellulose, hydroxypropylmethyl cellulose, and carboxymethyl cellulose, quarternary ammonium base containing water-soluble resins such as polyethyleneimine, and polyamide, and a modified compound thereof. Among these water-soluble resins (C), polyvinyl alcohol is preferably used to improve further color fading resistance of characters, etc. printed thermally.

In general, polyvinyl alcohol is obtained by hydrolyzing an acetyl group portion in a vinyl acetate polymer with a strong base such as sodium hydroxide to change an acetyl group to a hydroxyl group (that is, saponification). As a commercial polyvinyl alcohol, there are polyvinyl alcohols having various ratios of saponification (degree of saponification) and polymerization degree, and the present invention can use commercial polyvinyl alcohols. Any polyvinyl alcohols having an appropriate degree of saponification and degree of polymerization can be used as polyvinyl alcohol depending on the desired physical properties.

The degree of saponification is preferably in a range from 80 to 100%, and more preferably in a range from 95 to 100% in order to improve the solubility of polyvinyl alcohol in an aqueous medium, and further improve the color fading resistance of characters, etc. printed thermally.

In the present invention, polyvinyl alcohol having any degree of polymerization can be used. However, the degree of polymerization of polyvinyl alcohol is preferably in a range from 500 to 2,000 in order to improve ease of coating of the coating composition for producing a protective layer in the present invention and color fading resistance of characters, etc. printed thermally.

In addition, polyvinyl alcohol may be a so-called modified polyvinyl alcohol having various kinds of modifying groups. Examples of a modifying group include acetoacetyl group, silyl group, quarternary ammonium base, carboxylic acid group, carboxylate group, sulfonic group, sulfonate group, ketone group, mercapto group, amino group, and ethylene group. These can be introduced into polyvinyl alcohol by copolymerizing vinyl acetate and a monomer having the modifying group. In addition, it is also possible to react polyvinyl alcohol with various compounds which can introduce the modifying group.

As the modified polyvinyl alcohol, polyvinyl alcohol having an acetoacetyl group or a silyl group is preferably used. Thereby, color fading resistance of characters, etc. printed thermally is further improved.

The coating composition for producing a protective layer in a thermosensitive recording medium of the present invention preferably contains inorganic particles (D) other than the urethane resin (A), the water-soluble resin (C), and the aqueous medium.

The inorganic particles (D) further improve the offset printing suitability of a protective layer. The inorganic particles (D) contribute to producing a protective layer which can barely cause neither failure of a thermal printer caused by adhering a part of a protective layer peeled to a thermal head of a thermal printer, nor a printing defect (what is called "sticking").

Examples of the inorganic particles (D) include calcium carbonate, clay, talc, titanium oxide, magnesium carbonate, zinc oxide, aluminum silicate, silica, and aluminium hydroxide. Among these, clay, silica, or aluminium hydroxide is preferably used. In particular, clay is more preferably used, because this is easily dispersed in an aqueous medium, does not prevent color development of the thermosensitive layer in the thermosensitive recording medium, prevents movement of a plasticizer, etc. and further improves color fading resistance of characters, etc. printed thermally.

When the inorganic particles (D) are used as one component of the coating composition for producing a protective layer in the present invention, the mass ratio [polyurethane resin (A):water-soluble resin (C):inorganic particles (D)] between the polyurethane resin (A), the water-soluble resin (C), and the inorganic particles (D), which are contained in the coating composition is preferably in a range of 1 to 30:20 to 50:40 to 70. The coating composition for producing a protective layer having a mass ratio in the range can form a protective layer which has excellent offset printing suitability and color fading resistance of characters, etc. printed thermally, and can prevent the occurrence of sticking.

In addition, the coating composition for producing a protective layer in a thermosensitive recording medium of the present invention preferably contains a polyurethane resin other than the polyurethane resin (A), in addition to the polyurethane resin (A), the water-soluble resin (C), and the inorganic particles (D). In particular, it is more preferable to contain the polyurethane resin (B) having the structure derived from polyester polyol produced by reacting an aromatic polycarboxylic acid and polyol. The coating composition for producing a protective layer in the present invention which further contains the polyurethane resin (B) can form a protective layer having further excellent color fading resistance of characters, etc. printed thermally.

The polyurethane resin (B) can be produced using relatively cheap raw material. In contrast, in order to introduce the structure represented by the general formula (I) in the polyurethane resin (A), it is necessary to use relatively expensive raw material such as polyol (a1). Therefore, it is possible to reduce cost for producing a modifying agent for a coating composition for producing a protective layer in a thermosensitive recording medium of the present invention by using cheap polyurethane resin (B) together with the polyurethane resin (A).

The mass ratio [polyurethane resin (A):polyurethane resin (B)] between the polyurethane resin (A) and the polyurethane resin (B) which are contained in a coating composition of the present invention is preferably in a range of 10 to 90:10 to 90, and more preferably in a range of 10 to 50:50 to 90. The polyurethane resin composition for producing a protective layer in a thermosensitive recording medium, which contains the polyurethane resin (B) in the range, can form a protective layer having excellent offset printing suitability, and color fading resistance of characters, etc. printed thermally.

The coating composition for producing a protective layer in a thermosensitive recording medium of the present invention may contain various kinds of additives other than the various components which are explained above, if needed.

Examples of the additives include a cross-linking agent such as melamine compounds, epoxy compounds, glyoxal compounds, methylol urea compounds, aldehyde compounds, zirconium compounds, isocyanate compounds, and aziridine compounds. These cross-linking agents can be used to form a protective layer having excellent water resistance.

In addition, examples of the additives include a lubricant, for example, higher fatty acid metal salts such as zinc stearate and calcium stearate, higher fatty acid amides such as amide stearate and amide oleate, paraffin, paraffin oxide, polyethylene, and polyethylene oxide. These lubricants can be used to form a protective layer which cannot readily cause sticking.

Examples of the additive include a compound which is known as a leveling agent such as silicone compounds, acetylene diol compounds, and fluorine compounds, a defoaming agent, a fluorescent brightener, and an ultraviolet ray absorbent, in addition to the above-mentioned additives.

Next, a thermosensitive recording medium of the present invention is explained. The thermosensitive recording medium of the present invention has a thermosensitive layer (E) on a substrate, and a protective layer (F) on the thermosensitive color developing (E). The thermosensitive recording medium of the present invention is formed by applying the coating composition for producing a protective layer in the thermosensitive recording medium on the thermosensitive layer (E), and then evaporating the aqueous medium contained in the coated layer, because the coating composition contains the aqueous medium. Moreover, the thermosensitive recording medium may have a layer, if necessary, in addition to the thermosensitive layer (E) and the protective layer (F).

Examples of the substrate include paper, a plastic film, and a synthetic paper. Appropriate substrates can be used depending on the application of the thermosensitive recording medium.

In general, the thermosensitive layer (E) constituting the thermosensitive recording medium of the present invention contains a color former, a developer, and a binder resin. The thermosensitive layer (E) develops colors by reacting the developer which is heated and melted with a thermal head of a thermal printer, etc. with a color former, and forms desired characters, patterns, etc. in the thermosensitive recording medium.

Examples of the color former include (1) triarylmethane compounds such as 3,3-bis(p-dimethylaminophenyl)-6-dimethylaminophthalide (crystal violet lactone), 3,3-bis(p-dimethylaminophenyl)phthalide, 3-(p-dimethylaminophenyl)-3-(1,2-dimethylindole-3-yl) phthalide, 3-(p-dimethylaminophenyl)-3-(2-methylindole-3-yl) phthalide, 3-(p-dimethylaminophenyl)-3-(2-phenylindole-3-yl) phthalide, 3,3-bis(1,2-dimethylindole-3-yl)-5-dimethylaminophthalide, 3,3-bis(1,2-dimethylindole-3-yl)-6-dimethylaminophthalide, 3,3-bis(9-ethylcarbazole-3-yl)-5-dimethylamino phthalide, 3,3-bis(2-phenylindole-3-yl)-5-dimethylamino phthalide and 3-p-dimethylaminophenyl-3-(1-methylpyrrol-2-yl)-6-dimethylaminophthalide, diphenylmethane compounds (2) such as 4,4'-bis(dimethylaminophenyl)benzhydrylbenzyl ether, N-chlorophenyl leuco auramine, and N-2,4,5-trichlorophenyl leuco auramine, xanthene compounds such as rhodamine B anilinolactam, rhodamine B-p-chloroanilinolactam, 3-diethylamino-7-dibenzylaminofluoran, 3-diethylamino-7-octylaminofluoran, 3-diethylamino-7-phenylfluoran, 3-diethylamino-7-chlorofluoran, 3-diethylamino-6-chloro-7-methylfluoran, 3-diethylamino-7-(3,4-dichloroanilino)fluoran, 3-diethylamino-7-(2-chloroanilino)fluoran, 3-diethylamino-6-methyl-7-anilinofluoran, 3-dibutylamino-6-methyl-7-anilinofluoran, 3-dipentylamino-6-methyl-7-anilinofluoran, 3-(N-ethyl-N-tolyl)amino-6-methyl-7-anilinofluoran, 3-piperidino-6-methyl-7-anilinofluoran, 3-(N-ethyl-N-tolyl) amino-6-methyl-7-phenethylfluoran, 3-diethylamino-7-(4-nitroanilino)fluoran, 3-dibutylamino-6-methyl-7-anilinofluoran, 3-(N-methyl-N-propyl)amino-6-methyl-7-anilinofluoran, 3-(N-ethyl-N-isoamyl)amino-6-methyl-7-anilinofluoran, 3-(N-methyl-N-cyclohexyl)amino-6-methyl-7-anilinofluoran and 3-(N-ethyl-N-tetrahydrofurfuryl) amino-6-methyl-7-anilinofluoran, thiazine compounds (4) such as benzoyl leuco methylene blue and p-nitrobenzoyl leuco methylene blue, and spiro compounds (5) such as 3-methylspirodinaphthopyran, 3-ethylspirodinaphthopyran, 3,3'-dichlorospirodinaphthopyran, 3-benzylspirodinaphthopyran, 3-methylnaphtho-(3-methoxybenzo)spiropyran, and 3-propylspirobenzopyran. These can be used alone or in combination of two or greater.

Examples of the developer include 4-phenylphenol, 4-t-butylphenol, 4-hydroxyacetophenone, 2,2'-dihydroxydiphenyl, 2,2'-methylenebis(4-chlorophenol), 2,2'-methylenebis (4-methyl-6-t-butylphenol), 4,4'-ethylenebis(2-methylphenol), 1,1-bis(4-hydroxyphenyl)cyclohexane, 2,2-bis(4'-hydroxyphenyl)propane, 4,4'-cyclohexylidenebis(2-isopropyl phenol), 4,4'-dihydroxydiphenylsulfone, 2,4'-dihydroxydiphenylsulfone, benzyl 4-hydroxybenzoate, dimethyl 4-hydroxyphthalate, bis(4-hydroxyphenyl)acetate esters, alkyl gallate esters, phenol compounds such as novolac type phenol resin, aromatic carboxylic acids such as phthalic acid monoanilide paraethoxy benzoic acid, parabenxyloxy benzoic acid, 3-5-di-t-butyl salicylic acid, 3-5-di-α-methylbenzyl salicylic acid, 3-methyl-5-t-butylsalicylic acid, 4-n-octyloxy carbonyl aminosalicylic acid, and 4-n-decyloxy carbonyl aminosalicylic acid, and polyvalent metal salts thereof.

Examples of the binder resin include water-soluble adhesives such as polyvinyl alcohol, modified polyvinyl alcohol, starch, hydroxyethyl cellulose, methyl cellulose, carboxymethyl cellulose, gelatin, casein, sodium polyacrylate, acrylamide/acrylic acid ester copolymer, three-dimensional copolymer of acrylamide/acrylic acid ester/methacrylic acid, alkali salt of styrene/maleic anhydride copolymer, and alkali salt of ethylene/maleic anhydride copolymer, and latexes such as polyvinyl acetate, polyurethane, polyacrylic acid ester, styrene/butadiene copolymer, acrylonitrile/butadiene copolymer, methyl acrylate/butadiene copolymer, and ethylene/vinyl acetate copolymer.

The thermosensitive layer (E) preferably contains a sensitizer to improve the coloring sensitivity.

Examples of the sensitizer include fatty acid amides such as amide stearate, amide N-hydroxymethylstearate, amide behenate, amide N-hydroxymethylbehenate, amide N-stearylstearate, and amide ethylene bisstearate, urea derivatives such as N-stearylurea, naphthol derivatives such as 2-benzyloxy naphthalene, biphenyl derivatives such as m-terphenyl, 4-benzylbiphenyl, and 4-allyloxy biphenyl, polyether compounds such as 2,2'-bis(4-methoxyphenoxy)diethylether and bis(4-methoxyphenyl)ether, carboxylates such as diphenyl adipate, dibenzyl oxalate, di(4-chlorbenzyl) oxalate, dimethyl terephthalate, and dibenzyl terephthalate, sulonates such as phenyl benzenesulfonate, diphenylsulfones such as bis(4-allyoxyphenyl)sulfone, diketones such as 4-acetylacetophenone, acetoacetanilides, fatty acid anilides, and 1,2-bis (3,4-dimethylphenyl)ethane. These may be used alone or in combination of two or greater.

It is preferable that the thermosensitive layer (E) contain a pigment in order to improve a whiteness degree.

Examples of the pigment include inorganic pigments such as clay, talc, heavy calcium carbonate, light calcium carbonate, silica, calcium silicate, aluminum silicate, titanium dioxide, aluminium hydroxide, and zinc oxide, and organic pigments such as urea-formalin resin, phenol resin, epoxy resin, melamine resin, guanamine resin, and formalin resin.

It is preferable that the composition for the thermosensitive layer containing the color former, the developer, the binder resin, and the other additives, which is usable to form the thermosensitive layer (E), be dispersed in the aqueous medium using a dispersion machine such as a ball mill and a sand grinder. In that case, a dispersing agent may be used as long as this does not prevent color development.

Examples of the dispersing agent include surfactants having a low molecular weight such as di-2-ethylhexyl sulfosuccinate, dodecylbenzenesulfonate, alkyldiphenyl ether disulfonate, alkylnaphthalene sulfonate and a hexametaphosphonate; and water-soluble polymers such as starch, hydroxyethyl cellulose, methyl cellulose, carboxymethyl cellulose, polyvinyl alcohol, modified polyvinyl alcohol, and polycarboxylates of ammonium salts of styrene-monoalkyl maleate.

The thermosensitive recording medium of the present invention can be produced by coating the composition for the thermosensitive layer on the various substrates, and drying to form the thermosensitive layer (E) on the substrate, then applying the coating composition for the protective layer in the present invention on the thermosensitive layer (E), and drying to form the protective layer (F).

The composition for the thermosensitive layer and the coating composition for a protective layer can be coated using a coating device such as an air knife coater, a blade coater, and a curtain coater.

It is preferable that the coating amount of the composition for the thermosensitive layer on the substrate be in a range of 2 to 12 g/m$^2$ in a nonvolatile components. In addition, it is preferable that the applying amount of the coating composition for the protective layer on the thermosensitive layer (E) be in a range of 1 to 10 g/m$^2$ in a nonvolatile component.

After coating the composition for the thermosensitive layer and the coating composition for the protective layer in the present invention, for example, the coated composition may be dried using a dryer. It is preferable that the temperature during the drying step be 70° C. or less in order to prevent color development in the thermosensitive layer constituting the thermosensitive recording medium of the present invention. Color development in the thermosensitive layer depends on a color former and a developer to be used. Therefore, it is preferable that drying be performed at as high a temperature possible unless the thermosensitive layer does not develop, from a viewpoint of raising productivity of the thermosensitive recording medium.

The thermosensitive recording medium of the present invention may have a well-known undercoat layer between the thermosensitive layer (E) and the substrate, if necessary, in order to improve heat responsiveness and adhesion between the substrate and the thermosensitive layer (E).

In addition, the thermosensitive recording medium of the present invention may have a well-known back coat layer on the back surface of the thermosensitive recording medium in order to prevent movement of a plasticizer from the back surface of the substrate, and prevent the thermosensitive recording medium from curving. Furthermore, the thermosensitive recording medium of the present invention may have an adhesion layer on the back surface thereof.

It is preferable that a contact angle over water of the protective layer (F) formed on the thermosensitive recording medium of the present invention be in a range of 90° to 150°. When the contact angle over water of the protective layer (F) is in the range, the protective layer (F) has excellent offset printing suitability, so it is possible to offset print clearly on the protective layer (F)

EXAMPLES

Below, the present invention is explained in detail referring Examples.

Reference Example 1

12.1 parts by mass of UW-90 [Engelhard Corporation products, clay], 48.5 parts by mass of 15% by mass-aqueous solution of GOHSEFIMER® Z-200 [Nippon Synthetic Chemical Industry Co., Ltd. products, acetoacetyl group-containing polyvinyl alcohol having a degree of saponification of 99%], 1.9 parts by mass of HYDRIN Z-7-30 [Chukyo Yushi Co., Ltd. products, 31.5% by mass-aqueous dispersion of zinc stearate], and 37.5 parts by mass of ion exchanged water were stirred using a juicer mixer to prepare a master batch (I) used to produce a coating composition for a protective layer in the thermosensitive recording medium of the present invention.

Reference Example 2

A master batch (II) was prepared in the same manner as in Reference Example 1, except that 48.5 parts by mass of 15% by mass-aqueous solution of PVA117 [Kuraray Co., Ltd., polyvinyl alcohol having a degree of saponification of 99%] was used instead of 15% by mass-aqueous solution of GOHSEFIMER® Z-200 [Nippon Synthetic Chemical Industry Co., Ltd. products, acetoacetyl group-containing polyvinyl alcohol having a degree of saponification of 99%]. Reference Example 3

A master batch (III) was prepared in the same manner as in Reference Example 1, except that the amount of UW-90 [Engelhard Corporation products, clay] used was changed to 9.7 parts by mass, the amount of 15% by mass-aqueous solution of GOHSEFIMER® Z-200 [Nippon Synthetic Chemical Industry Co., Ltd. products, acetoacetyl group containing-polyvinyl alcohol having a degree of saponification of 99%] used was changed to 58.1 parts by mass, and the amount of ion exchanged water used was changed to 30.4 parts by mass.

Reference Example 4

A master batch (IV) was prepared in the same manner as in Reference Example 3, except that 15% by mass aqueous solution of PVA117 [Kuraray Co., Ltd., polyvinyl alcohol having a degree of saponification of 99%] was used instead of 15% by mass-aqueous solution of GOHSEFIMER® Z-200 [Nippon Synthetic Chemical Industry Co., Ltd. products, acetoacetyl group-containing polyvinyl alcohol having a degree of saponification of 99%].

Example 1

59.4 parts by mass of Pripol 2033 [The Uniqema products, hydrogenated dimerdiol, hydroxyl equivalent: 271 g/Eq], 36.7 parts by mass of 2,2-dimethylol-propionic acid (abbreviated as "DMPA" below), 128.9 parts by mass of methyl ethyl ketone (abbreviated as "MEK" below) were put into a four-neck flask having a thermometer, an agitator, a flow-back condenser tube, and a dropping device, and stirred sufficiently.

Subsequently, 97.2 parts by mass of isophorone diisocyanate (abbreviated as "IPDI" below), and 0.1 part by mass of stannous octylate were added, and a MEK solution of a urethane prepolymer having an isocyanate group at the end was obtained by reacting at 75° C. for 15 hours.

Subsequently, after adding 18.6 parts by mass of 25% by mass-aqueous ammonia in the MEK solution of the urethane prepolymer, then 625.7 parts by mass part of ion exchanged water, 29.5 parts by mass of 10% by mass-diethylenetriamine aqueous solution were added in this order, and a translucent aqueous dispersion in which chain elongation reaction was fully progressed was obtained by reacting them at 40° C. for 1 hour. After that, the modifying agent (PU-1) for a coating composition for producing a protective layer in a thermosensitive recording medium, which is an aqueous dispersion of a polyurethane resin, was obtained by distilling under reduced pressure until the content of nonvolatile components became 25% by mass. Moreover, the mass ratio of [the structure represented by the general formula (I)/a carboxyl group and a carboxylate group] in the polyurethane resin contained in the modifying agent (PU-1) was 4.8.

Example 2

23.8 parts by mass of Pripol 2033 [The Uniqema products, hydrogenated dimerdiol, hydroxyl equivalent: 271 g/Eq], 85.5 parts by mass of MEK solution [nonvolatile component: 75% by mass, hydrogen equivalent: 650 g/Eq.] of polyester polyol which was obtained by reacting ethylene glycol, neopenthyl glycol, terephthalic acid, and isophthalic acid, 17.6 parts by mass of DMPA, and 102.6 parts by mass of MEK were put into a four-neck flask having a thermometer, an agitator, a flow-back condenser tube, and a dropping device, and stirred sufficiently.

Subsequently, 80.4 parts by mass of IPDI, and 0.1 part by mass of stannous octylate were added, and a MEK solution of a urethane prepolymer having an isocyanate group at the end was obtained by reacting at 75° C. for 8 hours.

Subsequently, after adding 9.0 parts by mass of 25% by mass-aqueous ammonia in the MEK solution of the urethane prepolymer, 611.0 parts by mass part of ion exchanged water, 66.4 parts by mass of 10% by mass-diethylenetriamine aqueous solution were added in this order, and a translucent aqueous dispersion in which a chain elongation reaction fully progressed was obtained by reacting them at 40° C. for 1 hour.

After that, the modifying agent (PU-2) for a coating composition for producing a protective layer in a thermosensitive recording medium, which is an aqueous dispersion of a polyurethane resin, was obtained by distilling under reduced pressure until the content of nonvolatile components became 25% by mass. Moreover, the mass ratio [the structure represented by the general formula (I)/a carboxyl group and a carboxylate group] of the polyurethane resin contained in the modifying agent (PU-2) was 4.0.

Comparative Example 1

156.8 parts by mass of a MEK solution [nonvolatile component: 75% by mass, hydrogen equivalent: 650 g/Eq.] of polyester polyol which was obtained by reacting ethylene glycol, neopenthyl glycol, terephthalic acid, and isophthalic acid, 6.5 parts by mass of DMPA, and 63.1 parts by mass of MEK were put into a four-neck flask having a thermometer, an agitator, a flow-back condenser tube, and a dropping device, and stirred sufficiently.

Subsequently, 29.4 parts by mass of tolylene diisocyanate, and 0.1 part by mass of stannous octylate were added, and a MEK solution of a urethane resin was obtained by reacting at 75° C. for 8 hours. Then, after adding 3.3 parts by mass of 25% by mass-aqueous ammonia and 740.8 parts by mass of ion exchanged water in the MEK solution of a urethane resin, a translucent aqueous dispersion was obtained.

After that, the modifying agent (PU-3) for a coating composition for producing a protective layer in a thermosensitive recording medium, which is an aqueous dispersion of a polyurethane resin, was obtained by distilling under reduced pressure until the content of nonvolatile components became 20% by mass.

Comparative Example 2

44.2 parts by mass of a toluene solution [nonvolatile component: 80% by mass, hydrogen equivalent: 642 g/Eq.] of stearyl group-containing diol which was obtained by reacting 2-(2-aminoethoxy)ethanol, stearyl acrylate, and hexamethylene diisocyanate, 146.8 parts by mass of a MEK solution [nonvolatile component: 75% by mass, hydrogen equivalent: 650 g/Eq.] of polyester polyol which was obtained by reacting ethylene glycol, neopenthyl glycol, terephthalic acid, and isophthalic acid, 8.6 parts by mass of DMPA, and 109.6 parts by mass of MEK were put into a four-neck flask having a thermometer, an agitator, a flow-back condenser tube, and a dropping device, and stirred sufficiently.

Subsequently, 36.8 parts by mass of tolylene diisocyanate, and 0.1 part by mass of stannous octylate were added, and a MEK solution of a urethane resin having a long chain alkyl group was obtained by reacting at 75° C. for 15 hours. Then, after adding 4.6 parts by mass of 25% by mass-aqueous ammonia and 645.8 parts by mass of ion exchanged water in the MEK solution of the urethane resin, a translucent aqueous dispersion was obtained.

After that, the modifying agent (PU-4) for a coating composition for producing a protective layer in a thermosensitive recording medium, which is an aqueous dispersion of a polyurethane resin having a long chain alkyl group was obtained by distilling under reduced pressure until the content of nonvolatile components became 20% by mass.

Examples 3 to 9 and Comparative Examples 3 to 6

The modifying agent (PU-1 and PU-2) for a coating composition for producing a protective layer obtained in Examples 1 and 2, the modifying agent (PU-3 and PU-4) for a coating composition for producing a protective layer obtained in Comparative Examples 1 and 2, the master batch (I) to (IV) obtained in Reference Examples 1 to 4, and ion exchanged water were mixed at the ratios shown in Tables 1, 2, and 3, respectively, and stirred for 15 minutes with an agitator having propeller wings to produce a coating composition (OC-1 to OC-11) for producing a protective layer in a thermosensitive recording medium.

TABLE 1

|  | Example 3 | Example 4 | Example 5 | Example 6 |
|---|---|---|---|---|
| Code of the coating composition | OC-1 | OC-2 | OC-3 | OC-4 |

TABLE 1-continued

|  |  | Example 3 | Example 4 | Example 5 | Example 6 |
|---|---|---|---|---|---|
| PU-1 | parts | 8.0 | 4.0 |  |  |
| PU-2 | by |  |  | 8.0 | 4.0 |
| PU-3 | mass |  | 5.0 |  | 5.0 |
| Master batch (I) |  | 90.0 | 90.0 | 90.0 | 90.0 |
| Ion exchanged water |  | 2.0 | 1.0 | 2.0 | 1.0 |

TABLE 2

|  |  | Example 7 | Example 8 | Example 9 |
|---|---|---|---|---|
| Code of the coating composition |  | OC-5 | OC-6 | OC-7 |
| PU-1 | parts | 2.4 | 2.3 | 2.3 |
| PU-2 | by |  |  |  |
| PU-3 | mass | 7.0 | 6.7 | 6.7 |
| Master batch (II) |  | 90.0 |  |  |
| Master batch (III) |  |  | 90.0 |  |
| Master batch (IV) |  |  |  | 90.0 |
| Ion exchanged water |  | 0.6 | 1.0 | 1.0 |

TABLE 3

|  |  | Comparative Example 3 | Comparative Example 4 | Comparative Example 5 | Comparative Example 6 |
|---|---|---|---|---|---|
| Code of the coating composition |  | OC-8 | OC-9 | OC-10 | OC-11 |
| PU-3 | parts | 10.0 |  | 9.0 |  |
| PU-4 | by |  |  |  | 10.0 |
| Wax Em | mass |  | 5.0 |  |  |
| Fluorine water reppelent |  |  |  | 1.0 |  |
| Master batch (I) |  | 90.0 | 90.0 | 90.0 | 90.0 |
| Ion exchanged water |  | 0 | 5.0 | 0 | 0 |

In Table 3, "Wax Em" means 40% by mass-aqueous dispersion of paraffin wax (Nippon Seiro Co., Ltd. products, Emuster-0135), and
"Fluorine water repellent" means 20% by mass-aqueous dispersion of fluororesin (Dainippon Ink & Chemicals, Inc. products, DICGUARD F-90N).

Comparative Example 7

7.8 parts by mass of UW-90 [Engelhard Corporation products, clay], 87.1 parts by mass of 10% by mass-aqueous solution of KL-118 [Kuraray Co., Ltd. products, carboxyl-modified polyvinyl alcohol], 1.5 parts by mass of HYDRIN Z-7-30 [Chukyo Yushi Co., Ltd. products, 31.5% by mass-aqueous dispersion of zinc stearate], and 3.6 parts by mass of ion exchanged water were stirred using a juicer mixer for 2 minutes to prepare a coating composition (OC-12) for producing a protective layer in a thermosensitive recording medium was obtained.

Examples 10 to 16 and Comparative Examples 8 to 12

The coating composition (OC-1 to OC-12) for producing a protective layer was coated on thermosensitive paper for fax (Matsushita Electric Co., Ltd. products, UG-0010A4) which does not have a protective layer using a wire bar numbered 16 such that the content of nonvolatile components was 3 g/m$^2$, and dried at 60° C. for 90 seconds using a dryer to produce a thermosensitive recording medium (TP-1 to TP-12).

The following evaluation tests were performed on the thermosensitive recording mediums, and the results are shown in Tables 4, 5, and 6.

[Evaluation Method for Thermosensitive Coloring Density]

A rectangular black picture (6 mm×30 mm) was printed on each thermosensitive recording medium (TP-1 to TP-12) using a word processor made by Sharp Corporation (SYOIN WD-220F) to produce a test piece. Then, the coloring density of black printed in a test piece was measured using the reflective coloring density meter D 186 produced by GretagMacbeth Company.

[Evaluation Method for Color Fading Resistance of Characters, Etc. Printed Thermally]

The test piece, which was produced in the same manner as in the [Evaluation method for thermosensitive coloring density], was adhered to a glass bottle such that the surface coated with the coating composition was not adhered to the glass bottle. Then a wrap made of vinyl chloride (Shin-Etsu Polymer Co., Ltd. products, polymawrap) was contacted closely with the printed parts of the test piece, and then this was left at 40° C. for 24 hours. Based on the thermosensitive coloring density before and after leaving, a retention ratio was calculated according to the following formula. When the value of retention ratio is about 90% or greater, the color fading resistance is at a sufficient level for practical use.

Retention ratio=[(thermosensitive coloring density after leaving)/(thermosensitive coloring density before leaving)]×100

[Evaluation Method for Whiteness Degree of a Non-Printing Part]

The non-printed part of each of the thermosensitive recording medium (TP-1 to TP-11) was observed visually. When the non-printed part is white, this is denoted by good. When the non-printed part is slightly developed, this is denoted by poor.

[Evaluation Method for Offset Printability]

After applying the coating composition (OC-1 to OC-12) for producing a protective layer using a wire bar numbered 16 on an art paper respectively, each test paper was obtained by drying for 90 seconds at 60° C. using a dryer.

Subsequently, DAICURE MV SEAL ASAGI-A1 (Dainippon Ink & Chemicals, Inc. products, UV offset ink) was printed on a portion where dampening water was not adhered and a portion where dampening water was adhered on the test paper. The dampening water used was a mixture solution containing ion exchanged water and isopropyl alcohol at a mass ratio (ion exchanged water:isopropyl alcohol) of 97:3.

Subsequently, the coloring density of cyan printed on portions, where dampening water was adhered and where dampening water was not adhered, was measured using the reflective coloring density meter D186, which was produced by GretagMacbeth Company.

After measuring, the ratio of the coloring density of the picture printed at the portion to which dampening water adhered relative to the coloring density of the picture printed at the portion to which dampening water was not adhered was calculated. When the ratio is about 50%, it can be considered that the protective layer has the offset printing suitability suitable for practical use.

[Measuring Method of a Contact Angle]

The contact angle over the water on each surface of the test paper produced by the same method as in the [Evaluation method for offset printing suitability] was measured using Drops Master 700 which is a contact angle meter produced by Kyowa Interface Science Co., Ltd. The contact angle measured was the value after 1 second of dropping.

TABLE 4

|  | Example 10 | Example 11 | Example 12 | Example 13 |
|---|---|---|---|---|
| Coating composition used | OC-1 | OC-2 | OC-3 | OC-4 |
| Thermosensitive recording medium obtained | TP-1 | TP-2 | TP-3 | TP-4 |
| Thermosensitive coloring density after leaving | 1.41 | 1.42 | 1.37 | 1.40 |
| Retention ratio (color fading resistance) (%) | 93 | 97 | 93 | 98 |
| Whiteness degree | good | good | good | Good |
| Offset printability (%) | 74 | 86 | 64 | 59 |
| Contact angle (°) | 91 | 95 | 107 | 102 |

TABLE 5

|  | Example 14 | Example 15 | Example 16 |
|---|---|---|---|
| Coating composition used | OC-5 | OC-6 | OC-7 |
| Thermosensitive recording medium obtained | TP-5 | TP-6 | TP-7 |
| Thermosensitive coloring density after leaving | 1.47 | 1.43 | 1.47 |
| Retention ratio (color fading resistance) (%) | 97 | 97 | 93 |
| Whiteness degree | good | good | good |
| Offset printability (%) | 74 | 84 | 81 |
| Contact angle (°) | 98 | 105 | 90 |

TABLE 6

|  | Comparative Example 8 | Comparative Example 9 | Comparative Example 10 | Comparative Example 11 | Comparative Example 12 |
|---|---|---|---|---|---|
| Coating composition used | OC-8 | OC-9 | OC-10 | OC-11 | OC-12 |
| Thermosensitive recording medium obtained | TP-8 | TP-9 | TP-10 | TP-11 | TP-12 |
| Thermosensitive coloring density after leaving | 1.46 | 1.47 | 1.44 | 1.44 | 1.43 |
| Retention ratio (color fading resistance) (%) | 96 | 23 | 91 | 98 | 96 |
| Whiteness degree | good | good | good | good | good |
| Offset printability (%) | 32 | 60 | 35 | 47 | 40 |
| Contact angle (°) | 43 | 96 | 49 | 82 | 42 |

INDUSTRIAL APPLICABILITY

The modifying agent for a coating composition for producing a protective layer in the thermosensitive recording medium of the present invention can provide excellent offset printing suitability and color fading resistance of characters, etc. printed thermally to the protective layer in a thermosensitive recording medium.

Therefore, it is possible to print by offset printing clear and colorful pictures, patterns, etc. on the non thermosensitive color developed portions on the thermosensitive recording medium having the protective layer formed of the coating composition for producing a protective layer in the present invention. Due to this, the thermosensitive recording medium of the present invention can be used as not only tain tickets, grocery labels, receipts, bills for gas or water, etc. but also in applications which are desired to have a design of a high level such as various admission tickets. The thermosensitive recording medium of the present invention is remarkably excellent in practical use.

The invention claimed is:

1. A modifying agent for a coating composition for producing a protective layer in a thermosensitive recording medium, wherein the modifying agent contains a polyurethane resin (A) comprising a structural unit represented by the following general formula (I) and a hydrophilic group, and an aqueous medium, where in the general formula (I), $R_1$ and $R_2$ represent individually an alkyl group, and m and n represent individually an integer of 1 or greater

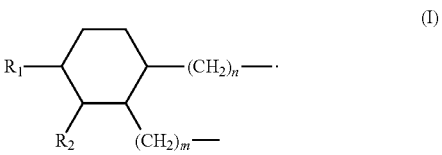

(I)

2. A modifying agent for a coating composition for producing a protective layer in a thermosensitive recording medium according to claim 1, wherein the polyurethane resin (A) contains the structural unit represented by the general formula (I) in a range from 5 to 50% by mass relative to the entire polyurethane resin (A).

3. A modifying agent for a coating composition for producing a protective layer in a thermo sensitive recording medium according to claim 1, wherein the hydrophilic group is added in a range from 50 to 2.000 mmol/kg relative to the total amount of the polyurethane resin (A).

4. A modifying agent for a coating composition for producing a protective layer in a thermo sensitive recording medium according to claim 1, wherein the hydrophilic group in the polyurethane resin (A) is at least one selected from the group of a carboxyl group and a carboxylate group.

5. A modifying agent for a coating composition for producing a protective layer in a thermosensitive recording medium according to claim 1, wherein the hydrophilic group in the polyurethane resin (A) is a carboxyl group or a carboxylate group, and the mass ratio [mass of the structural unit represented by the general formula (I)/number of a carboxyl group or a carboxylate group] is in a range from 2.0 to 15.0.

6. A modifying agent for a coating composition for producing a protective layer in a thermosensitive recording medium according to claim 1, wherein the polyurethane resin (A) is a resin produced by reacting a polyol (a1) comprising the structural unit represented by the general formula (I), an active hydrogen atom-containing compound (a2) having a hydrophilic group, and a polyisocyanate (a3).

7. A modifying agent for a coating composition for producing a protective layer in a thermosensitive recording medium according to claim 6, wherein the polyol (a1) having the structure comprising the structural unit represented by the general formula (I) is hydrogenated dimer diols (a1-1).

8. A modifying agent for a coating composition for producing a protective layer in a thermosensitive recording medium according to claim 1, wherein the modifying agent further contains a polyurethane resin (B) which has a structure derived from polyester polyol obtained by reacting an aromatic polycarboxylic acid and polyol, and a hydrophilic group.

9. A coating composition for producing a protective layer in a thermosensitive recording medium, wherein the coating composition contains a urethane resin (A) comprising a structural unit represented by the general formula (I) and a hydrophilic group, a water-soluble resin (C), and an aqueous medium, wherein the general formula (I), $R_1$ and $R_2$ represent individually an alkyl group, and m and n represent individually an integer of 1 or greater

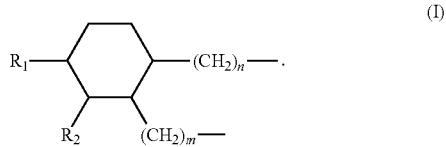

(I)

10. A coating composition for producing a protective layer in a thermosensitive recording medium according to claim 9, wherein the polyurethane resin (A) contains the structure represented by the general formula (I) in a range from 5 to 50% by mass relative to the entire polyurethane resin (A).

11. A coating composition for producing a protective layer in a thermosensitive recording medium according to claim 9, wherein the hydrophilic group is added in a range from 50 to 2.000 mmol/kg relative to the total amount of the polyurethane resin (A).

12. A coating composition for producing a protective layer in a thermosensitive recording medium according to claim 9, wherein the polyurethane resin (A) is a resin produced by reacting a polyol (a1) comprising the structural unit represented by the general formula (I), an active hydrogen atom-containing compound (a2) having a hydrophilic group, and a polyisocyanate (a3).

13. A coating composition for producing a protective layer in a thermosensitive recording medium according to claim 12, wherein the polyol (a1) comprising the structural unit represented by the general formula (I) is hydrogenated dimer diols (a1-1).

14. A coating composition for producing a protective layer in a thermosensitive recording medium according to claim 9, wherein the hydrophilic group in the polyurethane resin (A) is at least one selected from the group of a carboxyl group and a carboxylate group.

15. A coating composition for producing a protective layer in a thermosensitive recording medium according to claim 9, wherein the hydrophilic group in the polyurethane resin (A) is a carboxyl group or a carboxylate group, and the mass ratio [mass of the structure represented by the general formula (I)/number of a carboxyl group or a carboxylate group] is in a range from 2.0 to 15.0.

16. A coating composition for producing a protective layer in a thermosensitive recording medium according to claim 9, wherein the water-soluble resin (C) is polyvinyl alcohol.

17. A coating composition for producing a protective layer in a thermosensitive recording medium according to claim 9, wherein the coating composition further contains a polyurethane resin (B) which has a structure derived from polyester polyol obtained by reacting an aromatic polycarboxylic acid and polyol, and a hydrophilic group.

18. A coating composition for producing a protective layer in a thermosensitive recording medium according to claim 9, wherein the coating composition further contains inorganic particles (D).

19. A coating composition for producing a protective layer in a thermosensitive recording medium according to claim 18, wherein the inorganic particles (A) are made of at least one selected from the group consisting of clay, silica, and aluminum hydroxide.

20. A thermosensitive recording medium, wherein the thermosensitive recording medium comprises a thermosensitive layer (E) on a substrate, and a protective layer (F) on the thermosensitive color developing (E), and the protective layer (F) is formed by applying the coating composition for producing a protective layer in a thermosensitive recording medium according to claim 9 on the thermosensitive layer (E), and drying the coated layer.

21. A thermosensitive recording medium according to claim 20, wherein a contact angle over water of the protective layer (F) is in a range of 90° to 150°.

* * * * *